(12) United States Patent
Cheng

(10) Patent No.: US 6,324,852 B1
(45) Date of Patent: Dec. 4, 2001

(54) METHOD OF USING HIGH PRESSURE LN$_2$ FOR COOLING REACTORS

(75) Inventor: Alan Tat Cheng, Livingston, NJ (US)

(73) Assignee: Praxair Technology, Inc., Danbury, CT (US)

(*) Notice: Subject to any disclaimer, the term of this patent is extended or adjusted under 35 U.S.C. 154(b) by 0 days.

(21) Appl. No.: 09/489,912

(22) Filed: Jan. 24, 2000

(51) Int. Cl.$^7$ .................................................. F17C 7/02
(52) U.S. Cl. ................................................................ 62/52.1
(58) Field of Search ................................ 62/51.2, 52.1

(56) References Cited

U.S. PATENT DOCUMENTS

| | | | |
|---|---|---|---|
| 2,394,852 | * 2/1946 | Goddard | 62/52.1 |
| 3,255,597 | * 6/1966 | Carter | 62/62.1 |
| 4,880,041 | * 11/1989 | Yamada et al. | 141/167 |
| 5,362,455 | 11/1994 | Cheng | 422/253 |
| 5,394,827 | 3/1995 | Cheng | 117/206 |
| 5,477,691 | 12/1995 | White | 62/50.2 |
| 5,763,544 | * 6/1998 | Cheng et al. | 526/78 |
| 5,802,858 | 9/1998 | Cheng et al. | 62/121 |

* cited by examiner

Primary Examiner—William Doerrler
(74) Attorney, Agent, or Firm—Bernard Lau

(57) ABSTRACT

An apparatus for and method of delivering a liquid cryogen into a reaction vessel to cool an exothermic reaction within the vessel wherein the liquid cryogen can be supplied directly into the reaction vessel at a maximum high pressure of about 3000 psi is provided. The liquid cryogen may come directly from a high pressure liquid cryogen storage tank without any pressure regulators or control valves between the reaction vessel and the storage tank thereby reducing flashing and eliminating the need for sub-cooling the liquid cryogen.

5 Claims, 3 Drawing Sheets

METHOD OF USING HIGH PRESSURE LN$_2$ FOR COOLING REACTORS

FIELD OF THE INVENTION

The invention relates to a method of and apparatus for cooling exothermic reactions in a reaction vessel with a highly pressurized liquid cryogen.

BACKGROUND OF THE INVENTION

Cryogenic liquids may be used to cool exothermic reactions due to their refrigeration properties. A particularly direct approach would be to inject the liquid cryogen directly into the liquid reactants within a reaction vessel, thereby eliminating the potential freezing and fouling of the heat transfer surfaces. The liquid cryogen vaporizes instantaneously upon contacting the reaction mixture and transfers both the latent heat and the sensible heat to its surroundings.

However, injecting the liquid cryogen directly into the reaction vessel has proven very difficult because the liquid cryogen storage tank may be optimized only for a given pressure. For reaction tanks which are withdrawing both a liquid cryogen for cooling and a gas for blanketing, purging and other applications, for example, liquid nitrogen and nitrogen gas, it is necessary to set the tanks at the high working pressure. Therefore, the liquid cryogen must be withdrawn also at high pressure, e.g., 150 psi, but such an operating pressure is unfavorable for most liquid cryogen applications.

The problem with supplying liquid cryogen at high pressures is that the liquid cryogen will be saturated with the gaseous phase of the cryogen. When the pressure is reduced due to frictional losses, e.g., from valves or elevation, the liquid cryogen will flash off from the liquid as a gas. Since the gas may occupy several hundred times the volume of the liquid cryogen, gas will create blockage to the liquid cryogen line resulting in a substantial pressure drop and reduction in liquid cryogen supply. A reduction in the liquid cryogen supply may be a potential safety hazard when the cooling capacity is lost during the peak of self-accelerating exothermic reactions.

Conventional cryogenic cooling systems keep the supply pressure from the liquid cryogen storage tank low, e.g., about 50 psi, to minimize flashing across the valves. When there is a need for high pressure gas for blanketing, purging, etc., two separate tanks are required. For example, high pressure liquid nitrogen is transferred from trucks or the high pressure liquid nitrogen storage tank into a low pressure liquid nitrogen storage tank. The gas saturated at higher storage pressure will be venting off in the gas phase as it enters the low pressure storage tank. The vented gas is a lost product. Furthermore, flashing occurs when the liquid cryogen flows across any restricted devices such as pressure regulators or control valves. Unfortunately, these devices are necessary for precise temperature control of the reaction processes. Flashing across a control valve may cause the flow to stop due to vapor lock. Thus, it would be desirable to eliminate the need to transfer the liquid cryogen from a high pressure tank to a low pressure tank thereby reducing the lost of the vented gas. Also, it would be desirable to provide a liquid cryogen cooling system wherein flashing of the liquid cryogen is eliminated or substantially reduced.

Another conventional approach uses a sub-cooler wherein a portion of the liquid cryogen such as liquid nitrogen is diverted into a separate chamber and boiled off at reduced atmospheric pressure. The boiling liquid is heat exchanged with the main stream of liquid nitrogen at the higher pressure. Since the boiling point of the liquid nitrogen is lower at reduced pressure than the liquid nitrogen at the higher pressure, the boiling liquid nitrogen is capable of sub-cooling the liquid nitrogen at the lower pressure and condenses the nitrogen gas bubbles back into liquid. The vaporized nitrogen at the lower pressure is discharged to the atmosphere because it loses its pressure head and latent heat refrigeration value. The amount of loss will increase with the pressure of the liquid nitrogen storage tank, room temperature and frictional loss of the liquid nitrogen supply. Although the sub-cooled liquid nitrogen will have less tendency to flash off across the valves and fittings since the temperature is below its boiling point, additional liquid nitrogen must be diverted to the sub-cooler in order to provide sufficient refrigeration to sub-cool or condense the gas as the refrigeration quality of the liquid nitrogen supply is decreased. Thus, it would be desirable to eliminate the need to sub-cool the liquid nitrogen while retaining the refrigeration quality of the liquid nitrogen supply.

Bearing in mind the problems and deficiencies of the prior art, it is therefore an object of the present invention to provide a method of and apparatus for supplying liquid cryogen at high pressure with minimal flashing.

It is another object of the present invention to provide a method and apparatus for supplying liquid cryogen at high pressure directly into a reaction vessel for optimal cooling of exothermic reactions.

A further object of the invention is to eliminate the need to sub-cool the liquid cryogen while retaining the refrigeration quality of the liquid cryogen supply.

It is yet another object of the present invention to provide a single source for both high pressure gaseous nitrogen and high quality liquid nitrogen.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a liquid cryogen delivery system comprising an injector tube having a first end and a second end, a liquid cryogen source for supplying a flow of liquid cryogen into the injector tube, and a drive shaft within the injector tube, the drive shaft being movable towards the first end of the injector tube to discontinue the flow of liquid cryogen from the first end of the injector tube.

Preferably, the liquid cryogen delivery system further includes a shielding gas source for continuously supplying a shielding gas through the first end of the injector tube independent of the flow of liquid cryogen into the injector tube. Furthermore, a nozzle may be attached to the first end of the injector tube wherein the shielding gas forms a gas pocket adjacent a nozzle end to prevent reactants from freezing and clogging the nozzle when the liquid cryogen delivery system is used in conjunction with a reaction vessel.

In another aspect, the present invention is directed to an apparatus mounted into a reaction vessel for cooling a reaction within the vessel with a high pressure liquid cryogen comprising an injector tube having an inner concentric tube and an outer concentric tube having outlets at a first end of the injector tube, and a sealed second end, a drive shaft positioned within the inner concentric tube, a means for moving the drive shaft to regulate the outlet of the inner concentric tube, and a liquid cryogen supply connected to the inner concentric tube.

Preferably, the drive shaft has a plug adapted to fit into the outlet of the inner concentric tube to seal off the inner concentric tube. Preferably, the means for moving the drive shaft to regulate the outlet of the inner concentric tube comprises a manual drive mechanism to linearly move the drive shaft, a mechanical drive mechanism to linearly move the drive shaft, or a linear motor. Preferably, the liquid cryogen supply is selected from the group consisting of nitrogen, hydrogen, oxygen, helium, carbon dioxide, air and combinations thereof having a maximum pressure of about 3000 psi. Most preferably, the liquid cryogen supply comprises liquid nitrogen at a pressure of about 30 psi to about 300 psi.

This aspect may further include a shielding gas supply connected to the outer concentric tube adapted to provide a continuous flow of a shielding gas to prevent the liquid cryogen from freezing the nozzle and reactants in the vessel. Preferably, the shielding gas supply has a lower temperature than the liquid cryogen supply. Most preferably, the shielding gas supply is selected from argon, helium, air, oxygen, hydrogen or a substantially inert gas having a lower temperature than the liquid cryogen supply. Preferably, the shielding gas supply has a maximum pressure of about 3000 psi, and most preferably comprises nitrogen at a pressure of about 30 to about 300 psi.

This aspect may further include a nozzle located at the first end of the injector tube having openings corresponding to the outlets of the inner concentric tube and the outer concentric tube. The nozzle may have a wider opening corresponding to the outlet of the outer concentric tube than the opening corresponding to the outlet of the inner concentric tube such that the shielding gas is adapted to form a gas pocket when the drive shaft has a plug fitted into the outlet of the inner concentric tube preventing flow of the liquid cryogen supply from the injector tube.

In another aspect, the present invention is directed to a liquid cryogen delivery apparatus for use in a reaction vessel to cool exothermic reactions comprising an injector tube having an inner concentric tube and an outer concentric tube having outlets at a first end of the injector tube, a nozzle located at the first end of the injector tube having openings corresponding to the outlets of the inner concentric tube and the outer concentric tube, a drive shaft positioned within the inner concentric tube, a shielding gas supply connected to the outer concentric tube, a liquid cryogen supply connected to the inner concentric tube, and a motor for moving the drive shaft to open and close the outlet of the inner concentric tube to deliver a liquid cryogen into the reaction vessel.

Preferably, the liquid cryogen has a maximum pressure of about 3000 psi selected from the group consisting of nitrogen, hydrogen, oxygen, helium, carbon dioxide, air and combinations thereof. Most preferably, the liquid cryogen comprises liquid nitrogen at a pressure of about 30 psi to about 300 psi.

Preferably, the shielding gas supply is selected from argon, helium, air, oxygen, hydrogen or a substantially inert gas having a lower temperature than the liquid cryogen supply having a maximum pressure of about 3000 psi. Most preferably, the shielding gas supply comprises nitrogen gas having a pressure of about 30 psi to about 300 psi. The shielding gas supply connected to the outer concentric tube is adapted to provide a continuous flow of a shielding gas to prevent a liquid cryogen from freezing reactants in the nozzle and the vessel.

In yet another aspect, the present invention is directed to a method of cooling an exothermic reaction in a reaction vessel comprising the steps of providing a liquid cryogen delivery system comprising an injector tube having a first end and a second end, a liquid cryogen source for supplying a flow of liquid cryogen into the injector tube, a drive shaft within the injector tube, the drive shaft being movable to adjust the flow of liquid cryogen from the first end of the injector tube, and a shielding gas source for supplying a continuous flow of a shielding gas through the injector tube out into the reaction vessel, monitoring a reaction temperature within the reaction vessel, and injecting a liquid cryogen into the reaction vessel utilizing the liquid cryogen delivery system when the reaction temperature exceeds a predetermined value.

Preferably, during the step of providing a liquid cryogen delivery system, the liquid cryogen source and the shielding gas supply are a single source. During the step of injecting a liquid cryogen into the reaction vessel, the drive shaft is moved away from the first end of the injector tube preferably with a linear motor to permit the flow of liquid cryogen.

In yet another aspect, the present invention is directed to a method of cooling an exothermic reaction in a reaction vessel comprising the steps of providing a liquid cryogen delivery system comprising an injector tube having an inner concentric tube and an outer concentric tube having outlets at a first end of the injector tube, and a sealed second end, a nozzle located at the first end of the injector tube having openings corresponding to the outlets of the inner concentric tube and the outer concentric tube, a drive shaft positioned within the inner concentric tube, the drive shaft being movable and having a plug fitted to seal off the inner concentric tube when the drive shaft is moved toward the nozzle, and further being movable to open and close the outlet of the inner concentric tube, and a liquid cryogen supply connected to the inner concentric tube, monitoring a reaction temperature within the reaction vessel, and injecting a liquid cryogen into the reaction vessel utilizing the liquid cryogen delivery system when the reaction temperature exceeds a predetermined value.

Preferably, the step of providing the liquid cryogen delivery system further includes providing a shielding gas supply connected to the outer concentric tube and further including the step of providing a continuous flow of a shielding gas to prevent the liquid cryogen supply from freezing the nozzle and reactants in the vessel. Preferably, during the step of injecting a liquid cryogen into the reaction vessel, a linear motor moves the drive shaft away from the nozzle such that the liquid cryogen flows from the liquid cryogen supply through the inner concentric tube into the reaction vessel.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1A:
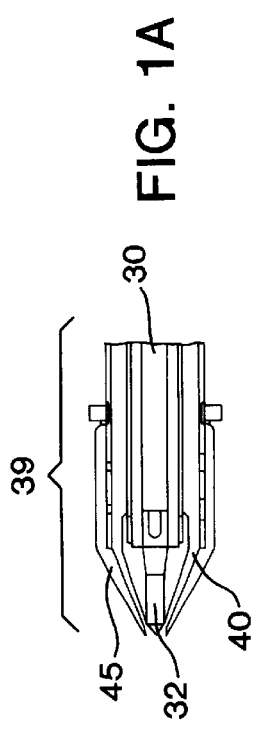
FIG. 1 is a cross sectional view of a liquid cryogen delivery system of the present invention.

In describing the preferred embodiment of the present invention, reference will be made herein to FIGS. 1–3 of the drawings in which like numerals refer to like features of the invention. Features of the invention are not necessarily shown to scale in the drawings.

The present invention provides an apparatus for delivering a liquid cryogen into a reaction vessel to cool an exothermic reaction within the vessel wherein the liquid cryogen can be supplied directly into the reaction vessel at a maximum high pressure of about 3000 psi. Contrary to conventional means of using liquid cryogens to cool exothermic reactions, the present invention does not require venting of the saturated gas given off by the liquid cryogen. Most importantly, sub-cooling of the liquid cryogen is not required. The liquid cryogen may come directly from the high pressure liquid cryogen storage tank without any pressure regulators or control valves between the reaction vessel and the storage tank. The present invention also provides a method of cooling exothermic reactions using the novel liquid cryogen delivery system.

Figure 1:
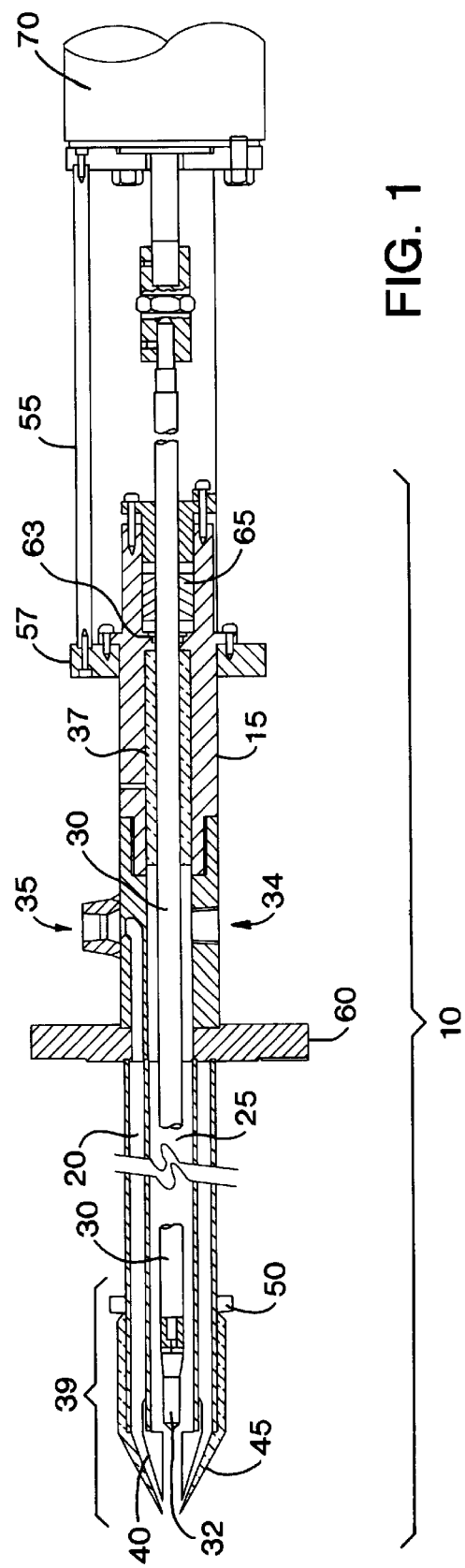
Figure 2:
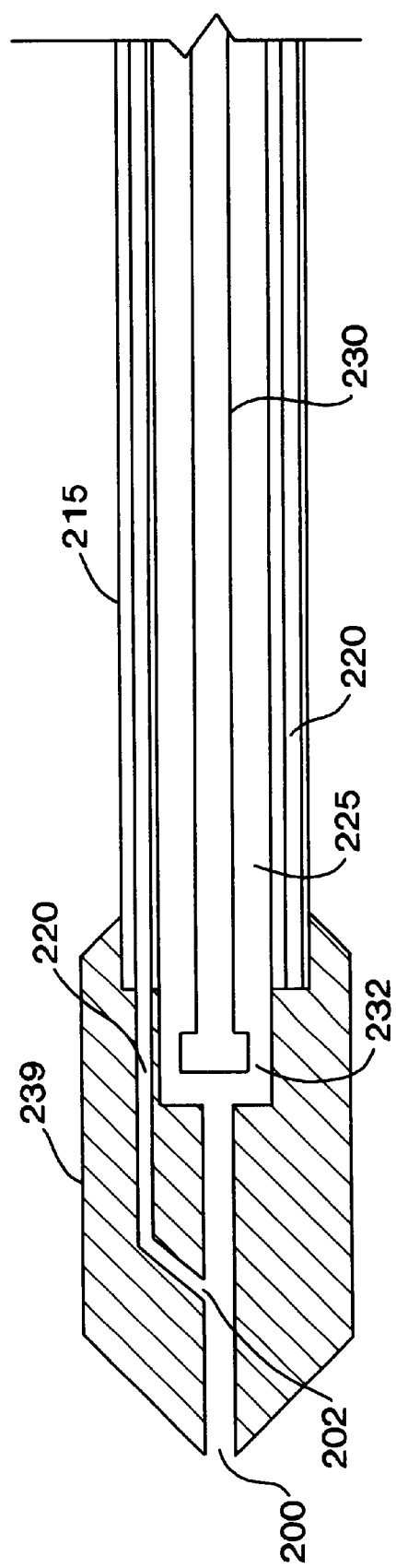
FIG. 2 is a cross sectional view of an alternative nozzle design for use in the liquid cryogen delivery system of the present invention.

FIG. 1 is a cross-sectional view of the liquid cryogen delivery system of the present invention. Injector tube 10 comprises a housing 15 encompassing outer concentric tube 20 and inner concentric tube 25. A center drive shaft 30 is disposed within inner concentric tube 25. Located at the end of the drive shaft is a plug 32. The materials which form the housing 15, inner and outer concentric tubes 20, 25 and plug 32 are preferably made of metal, e.g., stainless steel, bronze, aluminum, or some other material, e.g., TEFLON®, which is not affected by the extreme temperatures of the liquid cryogen. Materials such as carbon steel and rubber would not be suitable as they become brittle when in contact with the liquid cryogen.

Located at an end of housing 15 is a nozzle portion 39 comprising inner nozzle 40 and outer nozzle 45. Preferably, inner nozzle 40 comprises metal. Outer nozzle 45 may comprise TEFLON® to minimize freezing of any reactants within the reaction vessel. A locking ring 50 is provided to prevent outer nozzle 45 from falling off injector tube 10. Instead of a control valve, the flow of liquid cryogen is regulated by movement of drive shaft 30. Any flashing of the liquid cryogen now occurs across outer nozzle 45 instead of through the restrictions of a control valve or regulators which does not cause dangerous drops in pressure. The nozzles may be of different materials or shapes. Either plug 32 or inner nozzle 40 may be made of metal or one may comprise plastic. A combination of metal and plastic is most desirable to prevent the plug from seizing. Identical metals of equal hardness have a tendency to seize on close contact.

Although the actual shape of the nozzle is not believed to be particularly important, it must be shaped so that the shielding gas is able to form a small gas pocket on the tip of the injector tube and surrounding the inner nozzle. The small gas pocket is critical in preventing the reactants from filling the gap between the plug and the inner nozzle and freezing thereby plugging the nozzle opening when the liquid cryogen is no longer flowing. The shielding gas maintains pressure inside outer nozzle 45 to prevent reactants from flowing into the injector tube.

An inlet 34 for the liquid cryogen in housing 15 provides direct ingress of the liquid cryogen into inner concentric tube 25. An inlet 35 for the shielding gas provides direct ingress into the outer concentric tube 20. Thus, the liquid cryogen may enter from the side to travel within inner concentric tube 25 surrounding drive shaft 30. A shielding gas at room temperature flows down outer concentric tube 20 to keep the delivery system from excessive icing. Additionally, the double wall thickness of the injector tube insulates the reactants from the extreme temperature of the liquid cryogen as well. When drive shaft 30 is in a retreated position as in FIG. 1, the liquid cryogen will flow freely and in a downward direction due to the high pressure of the liquid cryogen. However, in FIG. 1A where drive shaft 30 is in a forward position, plug 32 is sealed against inner nozzle 40 to prevent the liquid cryogen flow.

An alternate design, depending on the shape of plug 30, may allow plug 32 to protrude from inner nozzle 40 to permit the flow of the liquid cryogen. An alternative nozzle design is illustrated in FIG. 2. Injector tube 215 comprises inner tube 225 wherein the liquid cryogen flows out from a liquid cryogen source (not shown) through opening 200 to cool reactants in a reaction vessel, and outer tube 220 which provides a shielding gas. When drive shaft 230 is in the open position as shown, the liquid cryogen flows along the injector tube 215 within inner tuber 225. The nozzle portion 239 may be sealed off by plug 232 when drive shaft 230 is extended towards nozzle opening 200 thereby discontinuing liquid cryogen flow. A shielding gas source (not shown) allows the shielding gas to continuously flow through an outer concentric tube 220 to opening 200 through the shielding gas outlet 202. The continuous flow of the shielding gas at the tip of the nozzle prevents reactants from freezing and clogging opening 200.

Referring back to FIG. 1, drive shaft 30 is most preferably controlled by a linear motor 70. Preferably, motor 70 is capable of traveling about 2 to about 6 inches in a linear direction. Motor 70 may be connected to drive shaft 30 by a coupling held together by set screws. A flange 57 may be used with a motor support mechanism 55 to hold motor 70.

Although a linear motor is preferred in controlling the position of drive shaft 30, other means may be employed. The following examples are contemplated but are by no means exhaustive. Drive shaft 30 may be moved by a gas actuated diaphragm. When gas is admitted to one side of a flexible diaphragm, the other side of the diaphragm will flex causing the drive shaft to move with it. A drawback may be the limited traveling distance provided by the diaphragm. Another means of controlling the drive shaft may be a rotating screw within a track with gears connected to the drive shaft. A variable speed motor may be linked to the rotating screw causing the drive shaft to move forward and backward to open and close the inner nozzle with plug 32. Of course, drive shaft 30 may also be operated manually by linear or rotational motion. An operator running a reaction may obtain a temperature reading of the reactants and manually move the drive shaft to provide the desired amount of liquid cryogen into the reaction vessel.

In order to prevent the high pressure liquid cryogen from leaking out of injector tube 10, a packing seal 65 may be used inside housing 15. Compression screws may be used to force the packing together to provide a tight seal surrounding drive shaft 30. The packing seal is preferably TEFLON® with graphite although other insulative materials may also be used. An O-ring 63 may also be used to ensure positive sealing pressure against leaks. To keep O-ring 63 and packing seal 65 from reaching cryogenic temperatures which causes the materials to freeze and become brittle, additional filler material 37, such as TEFLON®, may be used to increase the distance from O-ring 63 to the liquid nitrogen. The ambient temperature is sufficient to prevent the cryogenic temperatures from propagating to the seal or motor.

Figure 3:
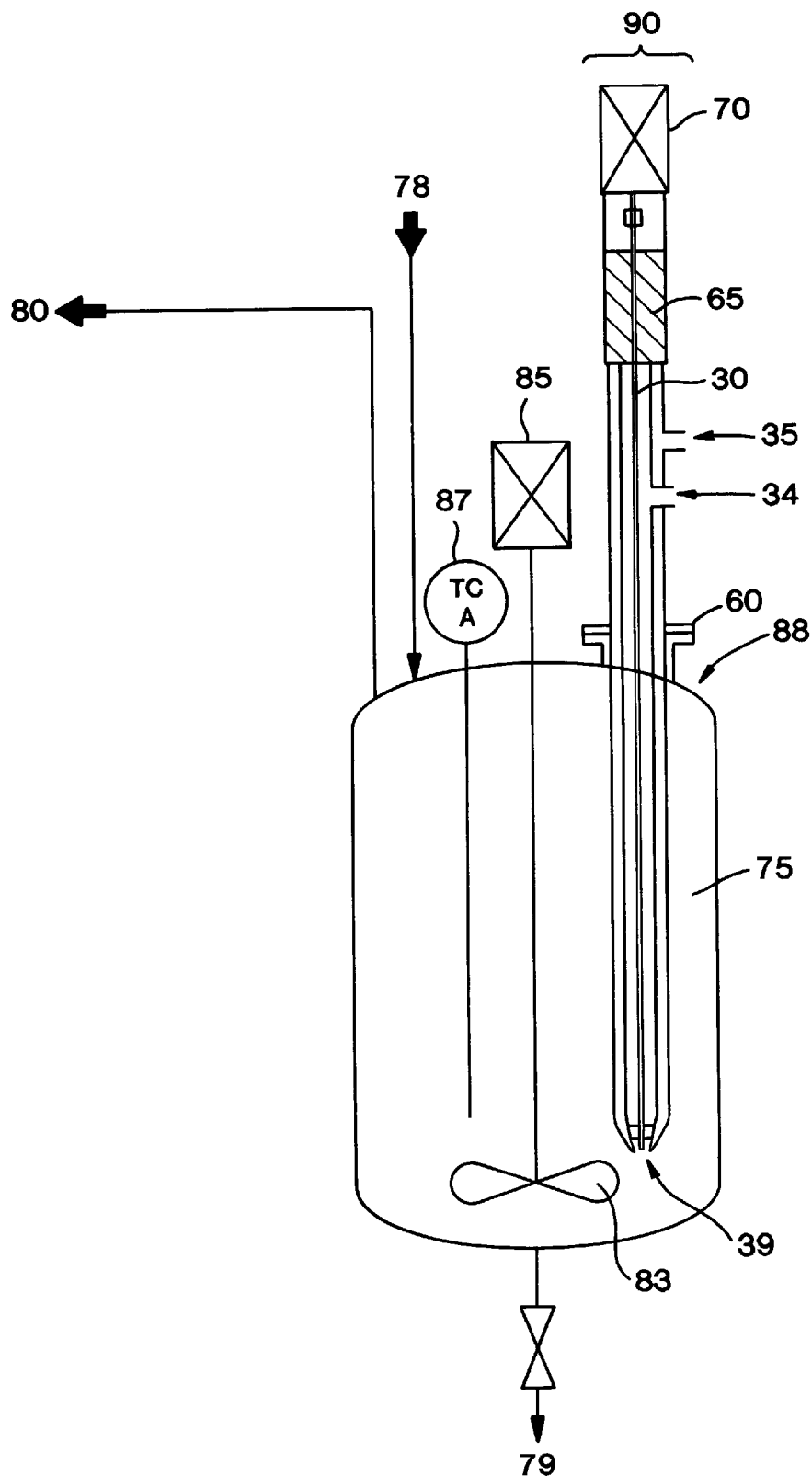
FIG. 3 is a schematic representation of a reaction vessel employing a liquid cryogen delivery system of the present invention.

FIG. 3 is a schematic representation of how the liquid cryogen delivery system of the present invention may be used within a reaction vessel to cool an exothermic reaction. Reaction vessel 75 preferably has an agitator 83 connected to a motor 85 for stirring reactants within reaction vessel 75. Reactants are provided into reaction vessel 75 via inlet 78 to proceed with the exothermic reaction. Outlet 80 provides a means for venting reaction vessel 75. An outlet 79 with a control valve allows passage of the reaction product from reaction vessel 75. Reaction vessel 75 further includes a temperature sensor 87 inserted into reaction vessel 75 for determining the temperature of the reaction mixture. Temperature sensor 87 is preferably connected to a temperature controller. If the temperature of the reaction mixture is too high, the controller will send a signal to the liquid cryogen delivery system to permit the flow of the liquid cryogen. If the controller senses the temperature as being too low or below a predetermined temperature, it will signal the liquid cryogen delivery system to stop the liquid cryogen flow.

For clarity, reference numbers in FIG. 1 are used to describe the liquid cryogen delivery system in FIG. 3. Liquid cryogen delivery system 90 may be inserted through a flanged opening 88 in reaction vessel 75 and locked into place with nuts and bolts onto injector flange 60 such that a portion of injector tube 10 is inserted in a downwardly direction within reaction vessel 75. A liquid cryogen supply snot shown) is connected to injector tube 10 at inlet 34 to provide the liquid cryogen directly into inner concentric tube 40. The liquid cryogens which may be used in the practice of this invention include liquid nitrogen, liquid argon, liquid helium, liquid carbon dioxide, and liquid air. Liquid nitrogen is most preferred. Generally the liquid cryogen may be supplied at a maximum pressure of about 3000 psi, but more preferably at about 200 to about 300 psi. Conventional cryogenic applications typically use liquid cryogens at pressures of about 30 to about 60 psi.

A shielding gas supply (not shown) is connected to shielding gas inlet 35 to provide the shielding gas necessary to prevent back flow and freezing of the reactants. The pressure of the shielding gas may be at a maximum of about 3000 psi but more preferably at about 30 to about 300 psi. Preferably, the shielding gas is the gaseous phase of the liquid cryogen such that a single source may provide both the liquid cryogen and the shielding gas.

A strainer may be used to remove any solid particulars in the gas lines for both the liquid cryogen supply and the shielding gas supply prior to entry into the injector tube. Although no regulator is needed, emergency shut off valves may be installed between the liquid cryogen supply and the reaction vessel in case of electrical failure, fire or other plant emergencies. Likewise, other valves may be installed for use in case of system failure so that reactants will not back up to the liquid cryogen inlet. If there are valves used with the system they should remain fully open during normal operation but are certainly not needed as the liquid cryogen may go directly into inner concentric tube 40 from the high pressure liquid cryogen storage tank. The shielding gas enters through outer concentric tube 45 at the same pressure as the liquid cryogen. The shielding gas may be regulated with an automatic or manual valve so that the flow rate is about 1% to about 20% of the liquid cryogen flow rate. The valve may also prevent the reaction mixture from backing into the shielding gas supply.

As the reaction proceeds, if the temperature of the reaction mixture exceeds a desired set point, drive shaft 30 will move back opening inner nozzle 40 partially or fully to permit liquid cryogen flow. The movement of drive shaft 30 is controlled by motor 70 which may be linked to temperature sensor 87 according to known means. When the temperature of the reaction mixture is cooler than the desired set point, drive shaft 30 moves forward to close inner nozzle 40 partially or fully. The liquid nitrogen flow rate may now be delivered and controlled based on the size of the opening of inner nozzle 40 as defined by drive shaft 30 and plug 32. Thus, control valves and other regulators are not required to provide precision temperature control in exothermic reactions.

The present invention achieves the objects recited above. The liquid cryogen delivery system of the present invention provides a method and apparatus for supplying liquid cryogen at high pressure, up to about 3000 psi, directly into a reaction vessel for direct cooling of reactants during an exothermic reaction. By directly injecting the liquid cryogen into the reaction vessel, there is no need to sub-cool the liquid cryogen, and flashing of the of the liquid cryogen is substantially reduced. The refrigeration quality of the liquid cryogen is maintained throughout the reaction time. Furthermore, a single high pressure source of both the liquid cryogen and the shielding gas may be used.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. An apparatus mounted into a reaction vessel for cooling a reaction within said vessel with a high pressure liquid cryogen comprising:
   a. an injector tube having an inner concentric tube and an outer concentric tube having outlets at a first end of said injector tube, and a seated second end;
   b. a drive shaft positioned within the inner concentric tube wherein said drive shaft comprises a plug adapted to fit into the outlet of the inner concentric tube to seal off the inner concentric tube;
   c. a means for moving said drive shaft to regulate the outlet of the inner concentric tube comprising a linear motor to linearly move the drive shaft;
   d. liquid cryogen supply connected to the inner concentric tube; and
   e. a shielding gas supply having a maximum of about 3000 psi and connected to the outer concentric tube adapted to provide a continuous flow of a shielding gas to prevent the liquid cryogen from freezing said nozzle and reactants in said vessel.

2. The apparatus of claim 1 further including a nozzle located at the first end of said injector tube having openings corresponding to the outlets of the inner concentric tube and the outer concentric tube.

3. The apparatus of claim 2 wherein said nozzle has a wider opening corresponding to the outlet of the outer concentric tube then the opening corresponding to the outlet of the inner concentric tube such that said shielding gas is adapted to form a gas pocket when said drive shaft has a plug fitted into the outlet of the inner concentric tube preventing flow of said liquid cryogen supply from said injector tube.

4. A liquid cryogen deliver apparatus for use in a reaction vessel to cool exothermic reactions comprising
   a. an injector tube having an inner concentric tube and an outer concentric tube having outlets at a first end of said injector tube, and a sealed second end;

b. a nozzle located at the first end of said injector tube having openings corresponding to the outlets of the inner concentric tube and the outer concentric tube;

c. a drive shaft positioned within the inner concentric tube;

d. a shielding gas supply having a maximum pressure of about 3000 psi connected to the outer concentric tube;

e. a liquid cryogen supply having a maximum pressure of about 3000 psi and a lower temperature than said liquid cryogen supply connected to the inner concentric tube; and f. a motor for moving said drive shaft to open and close the outlet of the inner concentric tube to deliver a liquid cryogen into said reaction vessel.

5. The liquid cryogen delivery apparatus of claim 4 wherein said shielding gas supply connected to the outer concentric tube is adapted to provide a continuous flow of a shielding gas to prevent a liquid cryogen from freezing said nozzle and reactants in said vessel.

* * * * *